United States Patent [19]

Frydendal

[11] 4,222,579
[45] Sep. 16, 1980

[54] NESTABLE TROLLEY WITH VOLUME REGULATION

[75] Inventor: Tom Frydendal, Oslo, Norway

[73] Assignee: Elopak A/S, Spikkestad, Norway

[21] Appl. No.: 917,402

[22] Filed: Jun. 20, 1978

Related U.S. Application Data

[63] Continuation-in-part of Ser. No. 829,089, Aug. 30, 1977, abandoned.

[30] Foreign Application Priority Data

Aug. 31, 1976 [NO] Norway .................................. 762990

[51] Int. Cl.² ............................................. B65D 7/26
[52] U.S. Cl. ............................. 280/33.99 H; 211/181; 280/79.3
[58] Field of Search ................. 280/33.99 R, 33.99 A, 280/33.99 B, 33.99 F, 33.99 C, 33.99 H, 79.1, 79.3, 179 R; 220/22.1, 22, 83, 85 B, 19; 105/378

[56] References Cited

U.S. PATENT DOCUMENTS

| 3,797,842 | 3/1974 | Swick, Jr. .......................... 280/36 R |
| 3,953,047 | 4/1976 | Morgan ................................ 280/639 |

FOREIGN PATENT DOCUMENTS

| 2021914 | 12/1971 | Fed. Rep. of Germany .......... 280/79.3 |
| 2355978 | 5/1974 | Fed. Rep. of Germany ... 280/33.99 H |
| 2339197 | 2/1975 | Fed. Rep. of Germany .......... 280/79.3 |
| 934711 | 5/1948 | France .................................... 280/79.3 |
| 2191515 | 2/1974 | France ............................. 280/33.99 H |
| 936390 | 9/1963 | United Kingdom .................... 280/79.3 |

*Primary Examiner*—David M. Mitchell
*Attorney, Agent, or Firm*—Haseltine, Lake & Waters

[57] ABSTRACT

A wagon or trolley which is especially suited for the transport and distribution of piles of cartons or parcels of various sizes which are stacked directly on top of each other, comprising a substantially rectangular bottom and four mutually connected walls. A first wall is pivotally connected with the adjacent wall and serves as a door, the first wall being adapted to swing about a vertical axis so as to offer unrestricted loading access to the loading zone of the wagon when in open position. A second wall is provided with an upper door portion which in a removed or lowered position provides an additional access opening to the contents of the wagon without increasing the outer dimensions of the wagon, the lower portion of the second wall being permanently connected to its adjacent side walls and offering necessary safety for the objects in the wagon to be kept in position when the upper door portion of the second wall is opened. A third wall is made adjustable in the lateral direction so as to vary the size of the wagon depending on the floor space occupied by the pile of cartons or parcels to be held and transported in the wagon.

15 Claims, 5 Drawing Figures

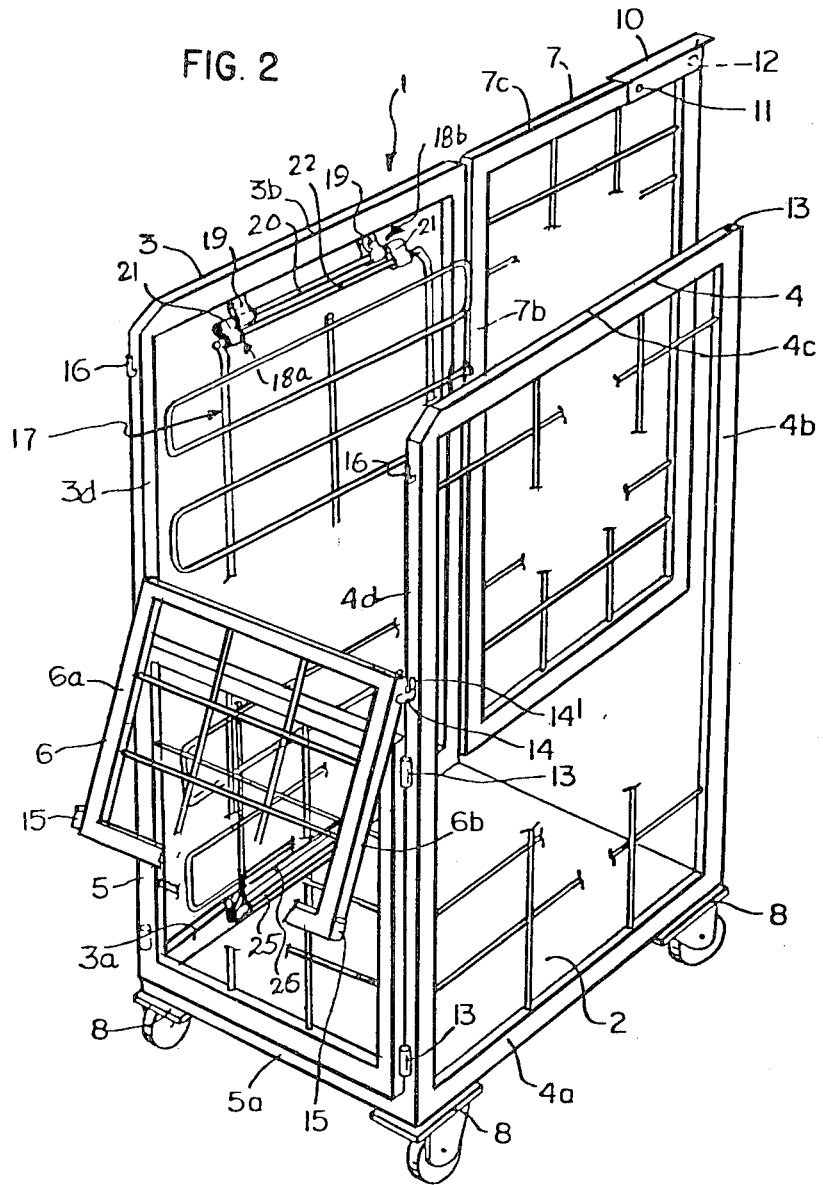

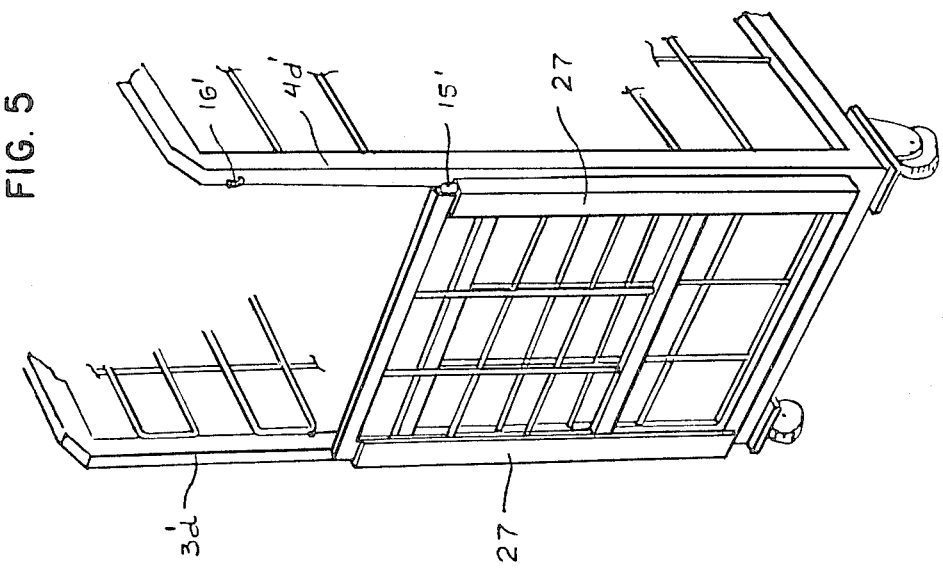
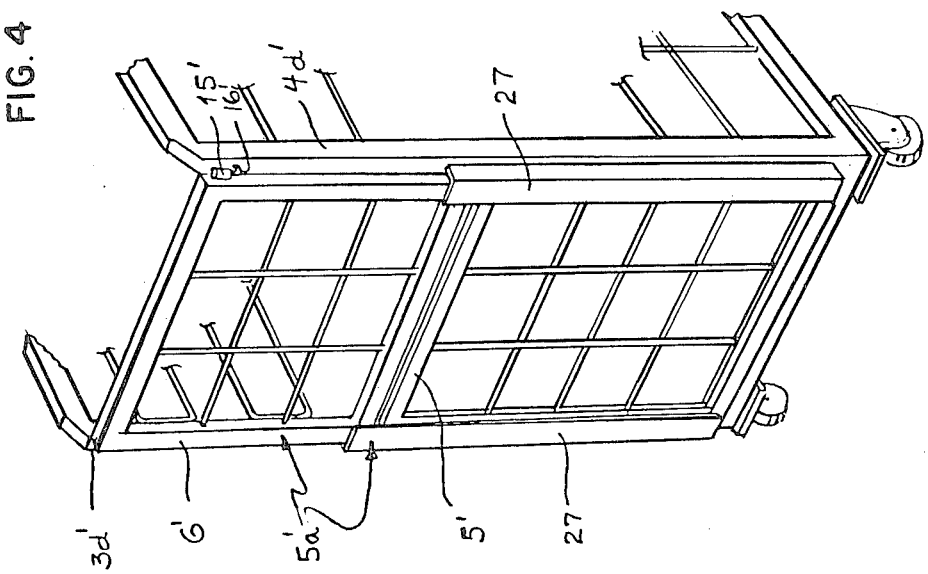

NESTABLE TROLLEY WITH VOLUME REGULATION

BACKGROUND OF THE INVENTION

This application is a continuation-in-part application of my earlier application Ser. No. 829,089 filed Aug. 30, 1977 and now abandoned.

FIELD OF THE INVENTION

The present invention relates to a wagon especially for holding and transporting milk cartons and parcels which are stacked directly on top of each other.

Such wagons which are used for the transport, for example, of milk cartons with flat tops usually comprises a first whole wall which is pivotally connected with the adjacent wall and serves as a door, said wall being adapted to swing about a vertical axis so as to offer unrestricted loading access to the loading area of the wagon when in open position. The loading of the cartons into the wagon can be carried out manually by putting the cartons in position one by one, or a complete stack of cartons may be put in position by means of a feeding or stacking device. The cartons rest steadily in the wagon, and at the destination, for example in a food store the wagon is located in, for example, a cooling well which is accessible to the customers in the store.

However, wagons having a full end wall which is utilized as a loading and unloading door provides little support for the contents when the door is fully opened or removed. This is especially the case on connection with milk cartons having a flattened top, which are stacked directly on top of each other, such cartons easily tilting forward when the door is opened. Many cartons may then fall out of the wagon, the consequence thereof being damage to the cartons and possible spilling and losing of the contents. This situation may even be more severe if the wagons are designed with a fixed volume, i.e. with a fixed floor space to be occupied by the stacks of parcels and cartons. The stacks of parcels or cartons will then fill the wagon with a larger or lesser play between the side surfaces defined by the cartons and the walls of the wagon depending on the size of the parcels or cartons. Thus, when a wagon is loaded with stacks of cartons of one size, the cartons may be fairly well supported by the walls of the wagons, whereas in other instances, when the cartons have another size and the pile thereof does not fit very well in the floor space of the wagon, they may, during the transport of the wagon, have obtained a skew position and therefore be more prone to tilt forward when the loading and unloading door is opened. Besides, the skewly positioned cartons, i.e. milk cartons, give a very messy impression in a food store.

PRIOR ART STATEMENT

From the Great Britain Pat. No. 936,390 there is known a hand truck comprising a platform to which are permanently welded upright members which constitute two end walls. However, this known truck does not comprise a first wall which is pivotally connected to an adjacent wall, let alone that such a wall is adapted to swing about a vertical axis so as to offer unrestricted loading access to the loading area of the truck. It is true that the removal of the double side boards may provide an unrestricted access to the loading area of the truck, but the removal and the positioning of such side boards are complicated and time consuming due to narrow clearance for the side boards in their respective slots.

In the French Pat. No. 934 711 there is disclosed a trolley or truck containing a series of trays, each of which carries a plurality of bottles. In such a trolley the loading and unloading of the bottles will be carried out on the same side, said trolley being symmetrical about a longitudinal center plane. The loading and unloading takes place through wall portions which do not swing about a vertical axis but a horizontal axis, the upper wall portions when lifted to the open position increasing the total height of the trolley condiserably, i.e. approximately by one half. Thus, the loading of such a known trolley cannot be carried out through an undivided wall which in a single operation can be swung about a vetical axis to give an unrestricted access to the loading area in the trolley. Besides, the increase of the total height of the trolley which is caused by the upper wall portions in their open position, is quite unacceptable if the trolley is to be located in a cooling well, because of the extra space required thereby.

German "Offenlegungsschrift" No. 2.355.978 discloses a wagon having a folding front door to fold the trolley into wedge shape stacking. The folding front door does not allow for access to the contents of the trolley, and the rear of this known trolley is only constituted by a flexible plate of a very limited size, the plate offering no support for parcels such as milk cartons with flat tops, which are stacked directly on top of each other. Therefore, the cartons may easily tilt during transport, the consequence thereof being damage to the cartons and possible spilling and losing of the contents thereof.

In U.S. Pat. No. 3,953,047 there is disclosed a collapsable, stackable cart comprising bottom, rear and side frames, but no front frame. Thus, this trolley can not be used for transporting milk cartons stacked directly on top of each other since the walls of the cart do not give sufficient support for the cartons.

In German "Offenlegungsschrift" No. 2.021.914 there is disclosed a wagon comprising a first wall adapted to be swung about a vertical axis to offer an unrestricted loading axis as well as a second wall provided with an upper as well as a lower door portion which may be opened to provide an additional access opening for the contents in the trolley. However, the first wall of the trolley disclosed in this publication is adapted to be swung inwardly only, i.e. for being positioned parallel to the inner side of the adjacent wall, that is within the trolley when loading or unloading of the trolley is to be effected. Thus, when the wagon is loaded, the inwardly swung first wall must remain open until the wagon has been unloaded. Besides, the bottom of the known trolley is made up of a Z-shaped sturdy and stationary frame holding two opposite walls in a fixed parallel relation. Further, this known trolley comprises no size regulating means adapted to be set in various positions depending on the size of the cartons to be transported in the trolley.

From German "Offenlegungsschrift" No. 2.339.197 there is known a trolley having a rear wall and a side wall rigidly connected to each other and defining a fixed right angle. It is true that in one of the embodiments disclosed in the mentioned publication there is included a flap door which can be swung about a horizontal axis to an open hanging position. However, the flap door does not extend the full width of its associated wall, nor is this flap door contemplated for use in connection with an opposite pivotable door and adjustable size regulating means.

French Pat. No. 2,191,515 relates to a nestable trolley having a front end wall which is made of one piece, all four walls of the known trolley being covered by a lid. This known trolley does not include an additional access opening which in open position offers the necessary security that the objects in the trolley will remain therein when opened for delivery of the objects.

U.S. Pat. No. 3,797,842 relates to a wheeled cart of the collapsable type which is intended for use in handling large food containers such as milk container. This known cart is specifically characterized by inclined shelves which slope downwardly from the front of the cart towards the rear portion which is provided with a slidably mounted ladder or gate. Thus, this known cart does not comprise the remedies necessary for giving an appropriate solution to the problem faced by the inventor and solved by the wagon according to the present invention.

SUMMARY OF THE INVENTION

An object of the present invention is to provide a wagon or trolley which may be used not only for the transport of objects, packages or cartons which may easily tilt when stacked on top of each other, but which also offers the necessary security that the objects will remain in the wagon when opened for the delivery of the objects.

Another object of the present invention is to provide a wagon or trolley including adjusting means so as to offer necessary support for the cartons in the wagon during transport and delivery independently of the various sizes of the cartons.

According to the invention these objects are obtained by a wagon, especially for holding and transporting milk cartons and parcels which are stacked directly on top of each other comprising in combination:

four mutually connected walls, i.e. a front wall, a rear wall and two opposite walls, the rear wall being a whole wall pivotally connected to an adjacent side wall and being adapted to swing about a vertical axis so as to offer unrestricted loading access to the loading area of the wagon, the front wall having a lower stationary portion and an upper door portion which extends the full width of said front wall and which in removed or lowered position provides an additional access opening to the contents in the wagon without increasing the outer dimensions of the wagon, the lower stationary portion of said front wall offering necessary security for the objects in the wagon to be maintained in position when said upper door portion of the front wall is opened, at least one of the remaining walls comprising a size regulating means so as to vary the width and/or the length of the wagon depending on the floor space occupied by the pile of cartons to be held in the wagon.

In a special embodiment of the present invention, the wagon comprises in combination:

four mutually connected walls, i.e. a front wall, a rear wall, and two opposite side walls, said side walls being pivotably attached to either vertical side of the front wall, a rectangular bottom pivotally connected to the bottom edge of the front wall, said bottom in lowered, horizontal position serving to lock the pivotable side walls in a parallel relation and in a raised position allowing the side walls to be swung apart to allow wagons of the same type and size to be nested, the rear wall being a whole wall pivotally connected to an adjacent side wall and being adapted to swing about a vertical axis so as to offer unrestricted loading access to the loading area of the wagon when this is assembled for transport purposes and so as to be swung out along the outside of said adjacent side wall of the wagon when this is prepared for nesting purposes when said side walls are obliquely swung out and the bottom raised, the front wall having a lower stationary portion to the side edges of which said side walls are pivotally connected, and an upper door portion which extends along the full width of said front wall and which in removed or lowered position provides an additional access opening to the contents in the wagon without increasing the outer dimensions of the wagon, the lower stationary portion of said front wall offering necessary security for the objects in the wagon to be maintained in position when said upper door portion of the front wall is opened, and at least one of the remaining walls comprising a volume regulating means so as to vary the width and/or the length of the wagon, depending on the floor space occupied by the pile of cartons or parcels to be held in the wagon.

In connection with the transportation of flat top milk cartons which are stacked directly on top of each other, the loading of cartons will generally be carried out automatically through the opening provided by the rear wall when this is completely opened, thus providing access over the full height of the wagon, whereas in most of the cases distribution or unloading of the contents will be effected through the opening in the front wall obtained by lowering the upper door portion thereof. By keeping the rear wall, as a whole wall the opening operation thereof may be carried out automatically by an appropriate loading apparatus working in close association with a product line of, for example, packed dairy products such as milk cartons. If the rear wall should be divided into an upper and a lower portion, this would require either complicated, releasable interlocking means between the two wall or door portions as well as a common locking means for the two door portions, or locking means for each door portion. Such solutions would, however, complicate the loading operation of the wagon, i.e. the opening and closing of the rear door to its fully opened and closed position, respectively, and especially when this operation is to be carried out automatically.

The remainder of the front wall, i.e. the lower stationary portion, will not only support the objects in the wagon so that they will not fall out, but also contribute to a sturdy wagon structure.

In the following, the invention will be further described in connection with the drawings, which illustrate embodiments of a wagon according to the invention.

BRIEF DESCRIPTION OF THE DRAWINGS

FIG. 2 is another perspective view of the wagon in FIG. 1, but illustrating the wagon with the rear wall and the upper, lowerable door portion of the front wall in open position and the adjustable wall section in a second space-reducing position.

FIGS. 4 and 5 are perspective views of portions of a second embodiment of a wagon according to the present invention, in which a sliding door portion of the front wall is illustrated in raised and lowered position, respectively.

DETAILED DESCRIPTION OF PREFERRED EMBODIMENTS

Figure 1:
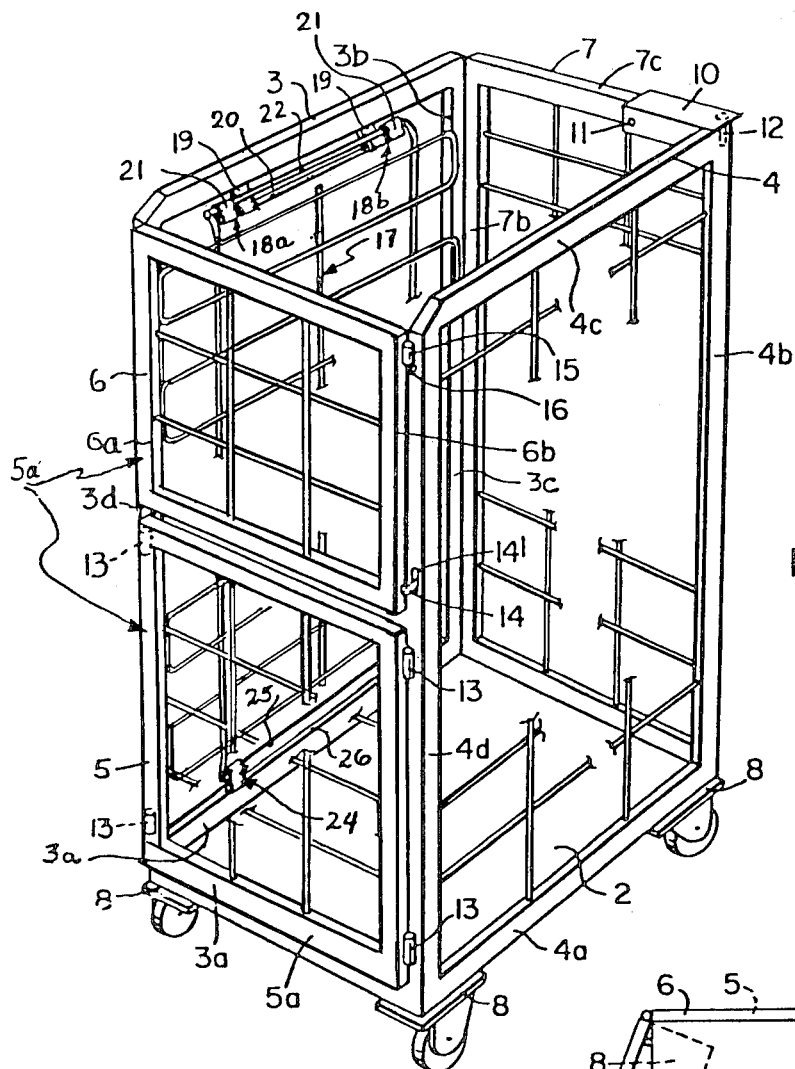
FIG. 1 is a perspective view of a first embodiment of a wagon according to the invention, the wagon being illustrated in a closed position ready for transport with its adjustable wall section in a first position.

The wagon illustrated in FIGS. 1 and 2 and generally designated by 1, comprises a bottom 2, two side walls 3 and 4, a front end wall generally designated 5a and consisting of a lower portion 5 and an upper portion 6, as well as a rear end wall 7. The side walls 3 and 4 may be somewhat longer than the end walls.

Each of the walls 3, 4 and 7 has as their basic structural element a rectangular frame, for example of profiled steel covered by a layer of epoxyplastic or similar. Between the frame sides there are arranged metal rods or ribs in a lattice pattern which is only partly indicated in the drawing, and which serve to support the parcels or cartons to be loaded in the wagon. Also the portions 5 and 6 are constructed as described above, i.e. with individual frames having ribs or rods arranged in a lattice pattern.

The bottom 2 which consists of a profiled plate of steel and/or plastic material, is pivotally connected to the lower frame parts 3a and 4a of the walls 2 and 3 respectively. In mounting pieces 8 which are affixed to the frame parts 3a and 4a, there are provided grooves (not shown) into which parts of the bottom 2 are fitted so as to achieve an attachment of the walls 3 and 4 when the wagon is in a position ready for transport. Additionally, the pieces 8 serve as mounting plates for four castors mounted one at each lower corner of the wagon 1.

As a consequence of the design of the bottom 2 discussed above, the bottom may be lowered or raised according to whether the wagon is to be used for transport or to be placed in a stacking position for nesting and being put away together with other similar wagons.

At one vertical edge 7b, the rear wall 7 carries hinge means (not shown) for pivotal mounting of the wall on the adjacent vertical edge 3b of the wall 3. At its upper edge 7c, the wall 7 has a means 10 serving to attach the wall 7 to the rear vertical edge 4b of the wall 4. The means 10 is shaped as a substantially U-shaped piece of metal which is pivotally mounted on the upper frame portion 7c at a point 11 thereon, and which at its free front end carries a pin 12 fitting into a corresponding hole 13 provided in the upper frame portion 4c of the wall 4. Preferably, the pin 12 is lockable by means of a locking piece (not illustrated). The wall 7 defines a door which may be swung from its closed position as illustrated in FIG. 1 to a completely open position as illustrated in FIG. 2, and in addition be swung past the last mentioned position to a position in which it contacts the wall 3 along the outside thereof as illustrated in FIG. 3.

Figure 3:
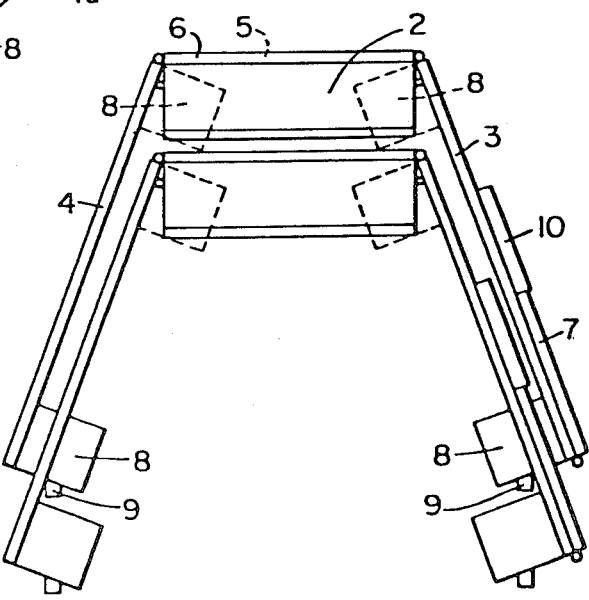
FIG. 3 is a plan view of two nested waggons.

In order to keep the door 7 in the position in which it is fully swung back as illustrated in FIG. 3, a locking means such as a snap lock may be provided, for example, at the upper edge of the door. If desired, the means 10 may be replaced by a profiled bar which is attached to the door 7 along the edge 7c thereof, and which aside from serving as a locking means for the door 7 in the closed position as illustrated in FIG. 1, also serves to secure the door 7 in the position in which it is fully swung back as shown in FIG. 3. Suitably, the door 6 may then be provided with hinge means which also permit a small lifting movement of the door. In locking the door to the wall 4, the lifting movement will be carried out manually. To facilitate the swinging of the door rearwardly towards the wall 3, the profiled bar may be so designed that the door 7 will automatically be lifted in position.

The front edge 3d and 4d of the walls 3 and 4 are attached to the lower portion 5 of the front end wall 5a by hinge means 13 so that the walls 3 and 4 can be swung apart when the bottom 2 is released from its attachment points and is raised to a position in which it is approximately parallel to the portions 5 and 6. Such a swung out position of the walls 3 and 4 is illustrated in FIG. 3, in which two wagons of the same type and size are nested. The stacking depth of the wagons is limited by the mounting pieces 8 as well as a locking bridle (not illustrated) which serves to maintain the bottom 2 in a raised position and is swung out of its locking position when the bottom is lowered.

The upper part 6 of the front wall is designed so as to be lowered, for example, to the position illustrated in FIG. 2, said part 6 at its side edges 6a and 6b carrying hinge means 14 fitting into slots 14' provided in the frame portions 3d and 4d of the walls 3 and 4, respectively. On each of the frame parts 6a and 6b, the door portion 6 has a sleeve-like means 15 which in the raised position of the door portion 6 can be hooked onto corresponding bolts 16 on the frame portions 3d and 4d, said slots 14' having a length sufficient to permit the hinge 14 on the door portion 6 to be lifted a distance corresponding to the height of the bolts 16.

As an alternative, the upper portion of the front wall may be provided with hinge means which fit into a slot provided in the side portions of the frame 5. Also in this case the slots in the frame 5 must permit a vertical lifting of the upper portion to permit it to be hooked into and off bolts on the frame portions 3d and 4d.

To allow adjustment of the width of the wagon one or more of the walls of the wagon are designed so that the lattice pattern serving to support the parcels or cartons when these are loaded in the wagon can be moved from a first position giving maximum space in the wagon to a second position in which the loading floor space is somewhat reduced. Thus, the inner width and possibly the inner length of the wagon may be adjusted and adapted to the size of the stack of cartons depending on the sizes thereof.

In the embodiment illustrated in FIGS. 1 and 2 the side wall 3 is provided with a width regulating means constituted as a lattice-shaped wall section 17 provided with upper and lower pairs of hinges which are adapted to allow the wall section to be moved between the above-mentioned positions.

The upper pair of hinges designated 18a and 18b, respectively, each comprises a metal piece 19 welded at its upper edge to the upper, horizontal steel profile of the rectangular frame of the wall 3. The metal pieces 19 have a curved shape and define at their edges opposite to the welded edges a bearing for a rotatable rod 20 extending between said metal pieces 19. At each end of the rod 20, i.e. outside the metal pieces, there is welded a link piece 21 which follows the rotating movement of the rod 20 and which at its opposite ends define tube-like bearings for the uppermost, horizontal rod 22 of the lattice-shaped wall section 17.

The lower pair of hinges of the wall section 17 of which only one is illustrated in FIGS. 1 and 2, each comprises a link piece 24 similar to upper link 21, which at two opposite edges is provided with pipe-like bearings. One of the pipe-like bearings of the link piece 24 embraces the lowermost, horizontal rod 25 of the wall section 17 for allowing the latter to rotate therein, whereas the opposite pipe-like bearing of the link piece 24 embraces the outer free ends of a rod 26 welded to the lower, horizontal steel profile 3a of the rectangular frame of the wall 3. The upper and lower pairs of hinges have similar geometry, thus allowing parallel movement of the wall section 17.

In FIG. 1 the width regulating wall section 17 is shown in its first position giving maximum loading space in the wagon, i.e. the wall section 17 is there arranged flush with or close to the profiled steel of the wall 3, the uppermost, horizontal rod 22 of the lattice-shaped wall section 17 being positioned above the rotatable rod 20.

In FIG. 2 the width regulating wall section 17 is shown in its second position giving a somewhat smaller loading space, the wall section now being offset inwardly of the wagon parallel to itself as evident from the drawing. In this second or offset position, the upper horizontal rod 22 of the lattice-shaped wall section 17 is positioned below the rotatable rod 20.

The position in which the width regulating wall section 17 is set depends on the size of the cartons to be stacked in the wagon. If, for example, the wagon is to be used for transporting milk cartons holding 2 liters each, the wall section 17 should be set in its first or raised position giving maximum loading space. If milk cartons holding 1 liter each are to be stacked in the wagon, the wall section 17 should be set in its lowered or offset position to allow for better support of the stack of cartons. With this width-regulating means, cartons of different sizes may be transported with maximum support, thus avoiding the possibility of skewing of the cartons during the transport of the loaded wagon.

In FIGS. 4 and 5 which is a view of a portion of a second embodiment of the wagon according to the present invention, the front wall 5a' is designed with sliding means which permit the upper portion 6' to slide along the lower portion 5'. The sliding means comprises L-shaped or U-shaped profiles 27 extending along the side edges of the lower portion 5'. The upper portion 6' of the front wall 5a' is designed so as to be moved from the raised position illustrated in FIG. 4 to the lowered position as illustrated in FIG. 5, said portion 6' at its upper corners carrying sleeve-like means 15' which in the raised position of the portion 6' can be hooked onto corresponding bolts 16' on the frame portions 3d' and 4d' and in the lowered position can rest on the upper edges of the L-shaped or U-shaped profiles 27. It is to be understood that the disclosed profiles have a length sufficient to permit the door portion 6' to be lifted a distance corresponding to the height of the bolts 16', and width in the upper region sufficient for giving the door portion such ample play that the sleeve-like means 17' of the door portion 6' can pass the bolts 16' when lowered. Suitable means (not illustrated) may be incorporated in the region of the profiles 27 to keep the door portion 6' therein when lifted free of or on the bolts 16'.

The above described embodiment is especially favorable if the wagon is to be used in connection with a cooling well having a relatively high front edge and the wagon is to be opened from the side at which the edge is located. By arranging the upper portion so that it can slide down along the lower portion of the front end wall, the necessary clearance between the wagon and the edge of the well only corresponds to the thickness of the upper portion.

It is convenient to design the elements of the wagon i.e. the walls and the bottom so as to be dismountable. The disclosed hinge means may then be so designed that by means of a simple tool, for example a mandrel, they can be knocked loose for permitting the respective wagon parts to be dismounted. Such a dismountable wagon of course, offers great advantage in the transport of wagons to the place of use, said wagon parts in dismounted condition being packed in packages having a minimum volume. Demountable wagons also offer the advantage that the erection of the wagon at the place of use is simple and rapid, and facilitates the replacement of possibly damaged parts.

The described wagon is especially suited for transport of packages or cartons which can easily tilt when stacked on top of each other. The whole wall to be opened over its full height provides for easy automatic loading, and the end wall which is located opposite said whole wall and is provided with a lowerable door portion, makes sure that the articles in the wagon will maintain their position in the wagon while providing for an opening large enough for easy extraction of the contents of the wagon. Additionally, the width or length regulating wall section offers optimum support of the cartons during transport and delivery.

Of course, the wagon according to the invention may be built in many other ways than described above without departing from the scope of the invention. Thus, the lowerable wall portion 6 or 6' may cover a larger or lesser part of the front wall, for example approximately half the wall, the size of the wall portion being dependent on the remaining dimensions of the wagon as well as the dimensions of the articles to be accommodated in the wagon. When the wagon is used for milk cartons and is rolled directly in position in a cooling well in a food store, the lowerable door portion should not occupy undue space where the wagon resides in the cooling well.

Further, it is to be understood that not only the side wall 3 can be provided with a volume regulating means, but any of the remaining walls of the wagon can be so provided. However, by adapting the regulating means to cover the most frequently used sizes of cartons and parcels to be transported by such wagons, it is sufficient to incorporate a volume regulating wall section in one of the side walls 3 or 4 and possibly in the whole rear end wall 7. Of course, the volume regulating wall section may be designed so as to be set in various positions for thereby giving an arbitrary volume regulation between its extreme positions.

Still further, it is to be understood that the invention is not limited to wagons of the above described type, i.e. wagons having pivotable side walls and a raisable bottom so as to be nestable, but may, of course, find application in all types of wagons consisting of a bottom and an arbitrary number of walls.

What I claim is:

1. A wagon for cartons and parcels which are stacked directly on top of each other, comprising in combination:

four mutually connected walls constituting a front wall, a rear wall and two opposite side walls, and a bottom the rear wall being a unitary wall pivotally connected to one adjacent side wall to swing about a vertical axis to provide unrestricted loading access to the loading area of the wagon, the front wall having a lower stationary portion and an upper door portion which extends the full width of said front wall and which has an opened position to provide an additional access opening for the contents in the wagon without significantly increasing the outer dimensions of the wagon, the lower stationary portion of said front wall providing securing for objects in the wagon to be maintained in position when said upper door portion of the front wall is opened, at least one of the rear and side walls comprising a size regulating means for permitting adjustment of said one wall parallel to itself for varying at least one of the dimensions of the wagon depending on the floor space occupied by the pile of cartons to be held in the wagon, and means at said bottom for transport of the wagon on a ground surface.

2. A wagon as claimed in claim 1 wherein said at least one wall includes a frame portion and a displaceable wall portion, said size regulating means comprising hinge means joining said wall portion to said frame portion for movement of said frame portion parallel to itself.

3. A wagon as claimed in claim 2 wherein said hinge means comprises a first rod rotatably secured to said frame portion link means secured to said first rod for following the rotation thereof, and a second rod pivotably supported by said link means and secured to said wall portion.

4. A wagon as claimed in claim 1, wherein the removable or lowerable door portion of the front wall comprises approximately the upper half of said front wall.

5. A wagon as in claim 1, wherein the openable door portion of the front wall is lowerable and includes connection means such that the portion first must be lifted for thereafter being swung down in a lowered, suspended position.

6. A wagon as claimed in claim 1, wherein the upper door portion of the front wall includes connector means such that the portion first must be lifted for thereafter being slidably lowered along the lower portion of the front wall.

7. A wagon as claimed in claim 6, comprising shaped profiles extending along the side edges of the lower portion of the front wall for slidably guiding the upper door portion.

8. A wagon as claimed in claim 1, wherein the size regulating means comprises a lattice-shaped wall section movable from a first stationary position giving maximum space in the wagon to a second stationary position in which the space in the wagon is reduced.

9. A wagon as claimed in claim 1, wherein the size regulating means comprises a lattice-shaped wall section adjustably movable between end positions.

10. A wagon for holding and transporting milk cartons and parcels which are stacked directly on top of each other, comprising in combination:

four mutually connected walls constituting a front wall (5a), a rear wall (7) and two oposite side walls (3,4), said side walls being pivotally attached to the front wall (5a), a rectangular bottom (2) pivotally connected to the bottom edge of the front wall (5a), said bottom having a lowered, horizontal position serving to lock the pivotable side walls (3,4) in parallel relation, and a raised position allowing the side walls (3,4) to be swung apart to allow wagons of the same type and size to be nested, the rear wall (7) being a unitary wall pivotally connected to one adjacent side wall (3) to swing about a vertical axis to provide unrestricted loading access to the loading area of the wagon when assembled for transport purposes, said rear wall being pivotable about said vertical axis so as to be swumg out along the outside of said adjacent side wall (3) of the wagon for nesting purposes when said side walls (3,4) are obliquely swung out and the bottom (2) raised, the front wall (5a) having a lower stationary portion (5,5') with side edges to which said side walls (3,4) are pivotally connected, and an upper door portion (6,6') which extends along the full width of said one front wall and which has an opened position to provide an additional access opening for the contents in the wagon without significantly increasing the outer dimensions of the wagon, the lower stationary portion (6,6') of the front wall providing security for objects in the wagon to be maintained in position when said upper door portion of the front wall is opened, and at least one of the rear and side walls comprising a volume regulating means for permitting adjustment of said wall parallel to itself for varying at least one dimension of the wagon depending on the floor space occupied by the pile of cartons or parcels to be held in the wagon, and means at said bottom for transport of the wagon on a ground surface.

11. A wagon as claimed in claim 10 wherein said at least one wall includes a frame portion and a displaceable wall portion, said volume regulating means comprising hinge means joining said wall portion to said frame portion for movement of said frame portion parallel to itself.

12. A wagon as claimed in claim 11 wherein said hinge means comprises a first rod rotatably secured to said frame portion, link means secured to said first rod for following the rotation thereof, and a second rod pivotably supported by said link means and secured to said wall portion.

13. In a wagon for holding and transporting milk cartons and parcels which are stacked directly on top of each other, comprising:

four mutually connected walls constituting a front wall (5a), a rear wall (7) and two opposite side walls (3,4), said side walls being pivotally attached to the front wall (5a), a rectangular bottom (2) pivotally connected to the bottom edge of the front wall (5a), said bottom having a lowered, horizontal position serving to lock the pivotable side walls (3,4) in parallel relation, and a raised position allowing the side walls (3,4) to be swung apart to allow the nesting of wagons of the same type and size, the rear wall (7) being a unitary wall pivotally connected to one adjacent side wall (3) to swing about a vertical axis to provide unrestricted loading access to the loading area of the wagon when assembled for transport purposes, said rear wall being pivotable about said vertical axis so as to be swung out along the outside of the said adjacent side wall (3) of the wagon for nesting purposes with said side walls (3,4) obliquely swung out and the bottom raised, the improvement wherein said front wall (5a) comprises a lower, stationary portion (5,5') having side edges to which said side walls (3,4) are pivotally connected and an upper door portion (6,6') which extends along the full width of the front wall, and which has an opened position to provide additional access opening for the contents in the wagon without significantly increasing the outer dimensions of the wagon, the lower portion (6,6') of said front wall providing security for the objects in the wagon to be maintained in position when said upper door portion of the front wall is opened, at least one of the rear and side walls comprising a volume regulating means for permitting adjustment of said one wall parallel to itself for varying at least one of dimensions of the wagon depending on the floor space occupied by the pile of cartons or parcels to be held in the wagon, and means at said bottom for transport of the wagon on a ground surface.

14. A wagon as claimed in claim 13 wherein said at least one wall includes a frame portion and a displaceable wall portion, said volume regulating means comprising hinge means joining said wall portion to said frame portion for movement of said frame portion parallel to itself.

15. A wagon as claimed in claim 14 wherein said hinge means comprises a first rod rotatably secured to said frame portion, link means secured to said first rod for following the rotation thereof, and a second rod pivotably supported by said link means and secured to said wall portion.

* * * * *